US006600640B1

(12) United States Patent
Buscher et al.

(10) Patent No.: US 6,600,640 B1
(45) **Date of Patent: *Jul. 29, 2003**

(54) ELECTROMAGNETIC RELAY

(75) Inventors: Thomas Buscher, Berlin (DE); Bican Samray, Schoenow (DE)

(73) Assignee: Tyco Electronics Logistics AG (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/555,695

(22) PCT Filed: Oct. 28, 1998

(86) PCT No.: PCT/DE98/03151

§ 371 (c)(1), (2), (4) Date: Aug. 16, 2000

(87) PCT Pub. No.: WO99/30338

PCT Pub. Date: Jun. 17, 1999

(30) Foreign Application Priority Data

Dec. 4, 1997 (DE) ........................................ 197 53 852

(51) Int. Cl.[7] ............................ H02H 3/08; H02H 9/02

(52) U.S. Cl. ...................................... 361/93.1; 365/210

(58) Field of Search ............................... 361/93.1, 139, 361/179, 187, 189, 93.9, 210; 335/151

(56) References Cited

U.S. PATENT DOCUMENTS 3,294,987 A 12/1966 Skrbina
3,911,342 A 10/1975 Herwig
3,959,694 A * 5/1976 Walsh ....................... 317/18 R
4,101,826 A * 7/1978 Horsitmann ................. 324/51
4,412,267 A * 10/1983 Hansen ........................ 361/104
4,611,154 A * 9/1986 Lambropoulos ............ 318/490
4,620,156 A * 10/1986 Alvin et al. ............... 324/424
4,922,369 A * 5/1990 Sakatos ........................ 361/88
5,684,447 A * 11/1997 Korczynski .................... 337/5
5,793,171 A * 8/1998 Hayashi et al. ............. 318/434

FOREIGN PATENT DOCUMENTS

| | | |
|---|---|---|
| DE | 1588418 | 6/1970 |
| DE | 1763394 | 1/1972 |
| DE | 2542724 | 4/1977 |
| GB | 2069765 | 8/1981 |

* cited by examiner

*Primary Examiner*—Kim Huynh
*Assistant Examiner*—Z Kitov
(74) *Attorney, Agent, or Firm*—Baker & Daniels

(57) ABSTRACT

The invention relates to an electromagnetic relay, comprising a magnetic system (6) with an exciting field coil ($W_R$), a core and an armature. Each load current circuit can be closed by a movable contact element and by at least one fixed contact element. A reed contact ($K_R$) is coupled to a load current conductor (1) in each load current circuit. Means to generate and process an overcurrent signal and to disconnect the control current are coupled to the reed contact ($K_R$).

20 Claims, 6 Drawing Sheets

ELECTROMAGNETIC RELAY

The invention relates to an electromagnetic relay having the ability to withstand short-circuit and overload.

Conventional solutions for ensuring short-circuiting and overload strength for a relay predominantly make use of protective means interrupting the load current in case of disturbances, using thermal effects. This includes in particular fuses or bimetal contact springs.

SU 142 74 72 A1 discloses a short-circuit protection for a rotary current motor, which is realized with the aid of reed relays. However, the reed relays are disposed separately from the motor relays there. In particular, with respect to the motor relays which switch on the voltage supply of the motor, there is no enquiry possible as to an overload or short circuit state.

It is the object of the invention to provide an inexpensive, integrated and in particular space-saving solution for a short-circuit- and overload-proof relay, in which in particular a differentiated response of the protective means in case of permanent overload of the relay, and not only in case of short-time current peaks, is desired.

According to the invention, this object is met by an electromagnetic relay comprising

- a magnetic system containing an exciting coil through which a control current flows, a core and an armature, with the core and the armature forming at least one operating air gap,
- at least one movable contact element and at least one fixed contact element through which one load current circuit each can be closed, coil and contact terminal elements,
- a reed contact in each load current circuit, which is coupled to a load current conductor having a load current flowing therethrough, and
- means for generating and processing an overcurrent signal and for switching off the control current.

A relay according to the invention is adapted to be reset to a normal operating state by interruption of the control current. In comparison with Hall sensors, which are also suitable for detecting a magnetic field emanating from a raised load current, reed contacts offer the advantages of a temperature-independent behavior, simple adjustment of triggering threshold values and simple realization of evaluation circuits.

Preferred developments concerning the arrangement of the reed contact in relation to the load current conductor, the shielding of the reed contact from the magnetic field of the exciting coil and with respect to the means for generating and processing the overcurrent signal and for switching off the control current are indicated in the dependent claims.

The invention shall now be elucidated in more detail by way of embodiments shown in the drawings, wherein FIG. 1 shows a relay according to the invention, comprising a reed contact pre-assembled to a circuit board;

Figure 1:
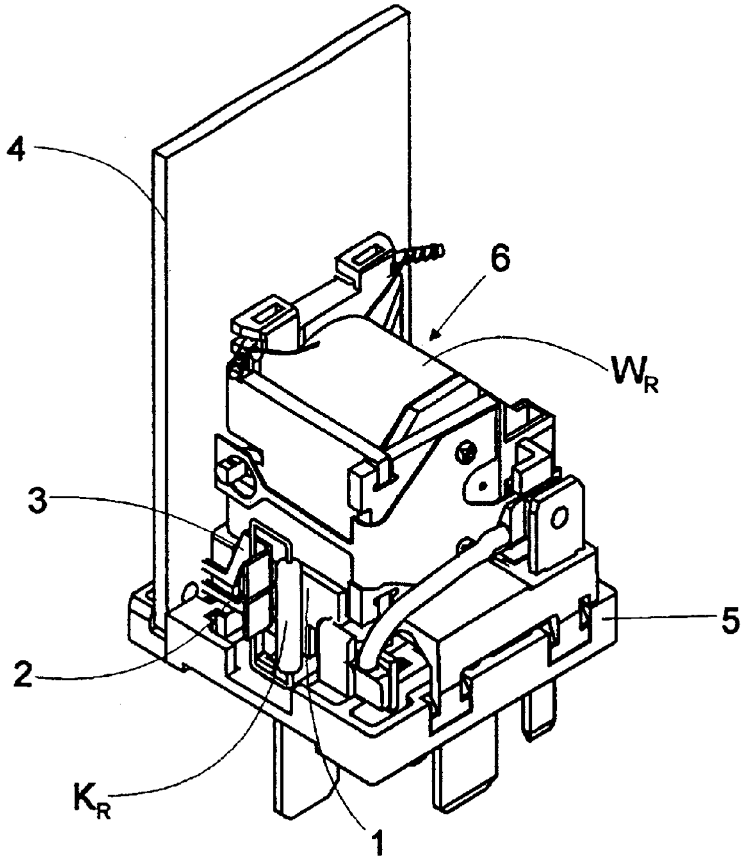
Figure 2:
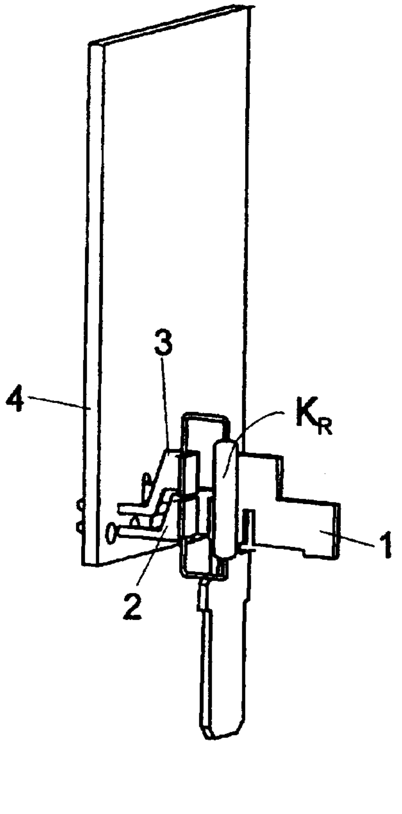
FIG. 2 shows the reed current pre-assembled to a circuit board, along with a coupled load current conductor according to FIG. 1.

FIGS. 1 to 6 show various embodiments of a relay according to the invention, comprising different modes of coupling a reed contact $K_R$ to a load current conductor 1. In the embodiment of FIG. 1, reed contact $K_R$ is pre-assembled to a circuit board 4. A header 5 has a magnetic system 6 arranged thereon, comprising a core, an armature and an exciting coil $W_R$. The axis of exciting coil $W_R$ extends parallel to the base plane of header 6. In an outer portion on header 5, circuit board 4 is attached in upright manner, perpendicularly to the base plane of header 5. The reed contact $K_R$ has two sheet-metal terminal plates 2 and 3 connected thereto (cf. also FIG. 2). By suitable choice of the distance between the two sheet-metal terminal plates 2 and 3, it is possible to define switching thresholds for the reed contact $K_R$. The two sheet-metal conductor terminating plates 2 and 3 are provided, along with reed contact $K_R$, on a circuit board 4, with reed contact $K_R$ being oriented perpendicularly to the base plane of header 5. In accordance with a preferred embodiment, reed contact $K_R$ thus is disposed perpendicularly to the axis of exciting coil $W_R$, so that reed contact $K_R$ is insensitive with respect to the magnetic stray flux of exciting coil $W_R$. Load current conductor 1 has a portion arranged perpendicularly to reed contact $K_R$, and in this respect it is to be ensured by suitable conductor design that the magnetic field generated by load current conductor 1 penetrates reed contact $K_R$ in central and parallel manner. With this embodiment, this is achieved in that the respective portion of load current conductor 1 is constituted by a sheet-metal strip having its sheet-metal plane extending parallel to reed contact $K_R$.

Figure 3:
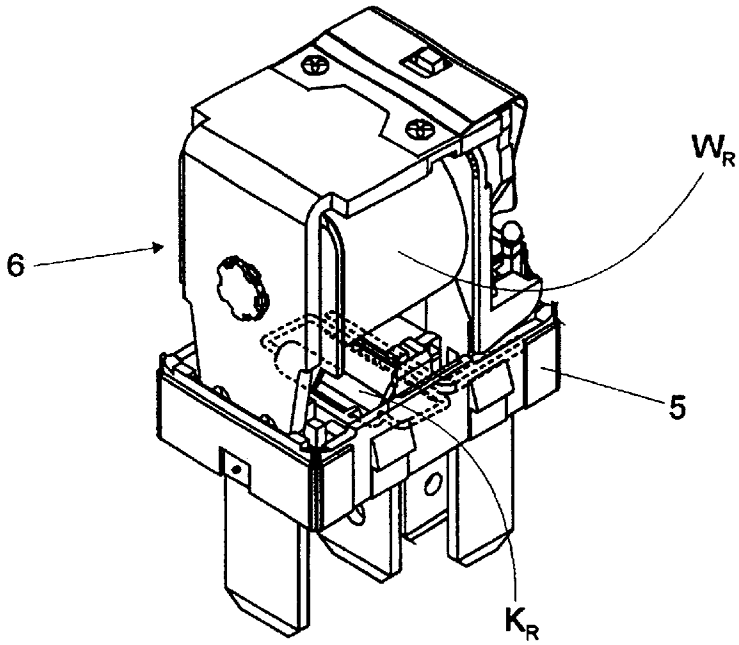
FIG. 3 shows a modification of a relay according to the invention comprising a reed contact inserted into a header.
Figure 4:
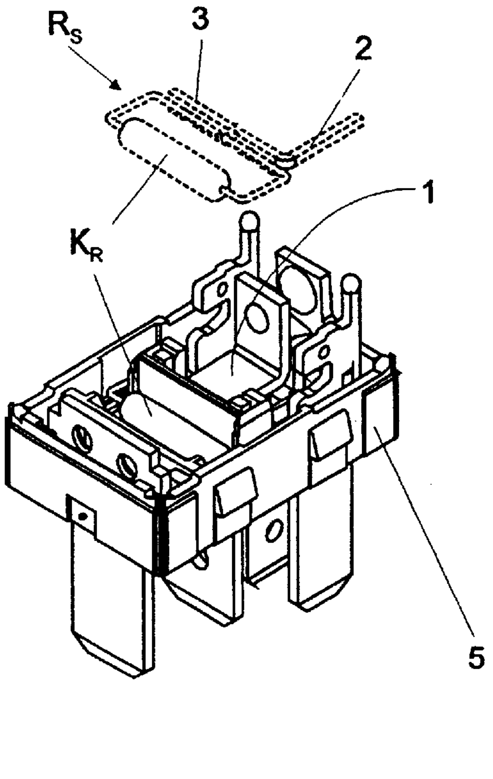
FIG. 4 shows the reed contact inserted in a header along with a coupled load current conductor according to FIG. 3.

In the embodiment shown in FIG. 3, magnetic system 6 is arranged on header 5 such that the axis of exciting coil $W_R$ extends parallel to the base plane of header 5. Between magnetic system 6 and header 5, reed contact $K_R$ is mounted perpendicularly to the axis of exciting coil $W_R$ and parallel to the base plane of header 5. In this embodiment, too, reed contact $K_R$ is connected to two sheet-metal contacting members 2 and 3 (cf. also FIG. 4). The two sheet-metal contacting members 2 and 3 are spaced apart by a distance determining the switching threshold of reed contact $K_R$. The unit constituted by sheet-metal contacting members 2 and 3 and reed contact $K_R$ is inserted in the header 5, with the load current conductor 1 having a portion inserted centrally through a sensor ring $R_S$ constituted by reed contact $K_R$ and sheet-metal contacting members 2 and 3. Load current conductor 1 in this portion is formed by a cranked sheet-metal strip so that sensor ring $R_S$, at a free end of the sheet-metal strip, is arranged perpendicularly to load current conductor 1 and encloses the same. As an alternative to the embodiment shown in FIG. 4, sensor ring $R_S$ may also be constituted by a U-shaped magnetically conducting flux ring and a reed contact $K_R$ coupled thereto via two air gaps.

Figure 5:
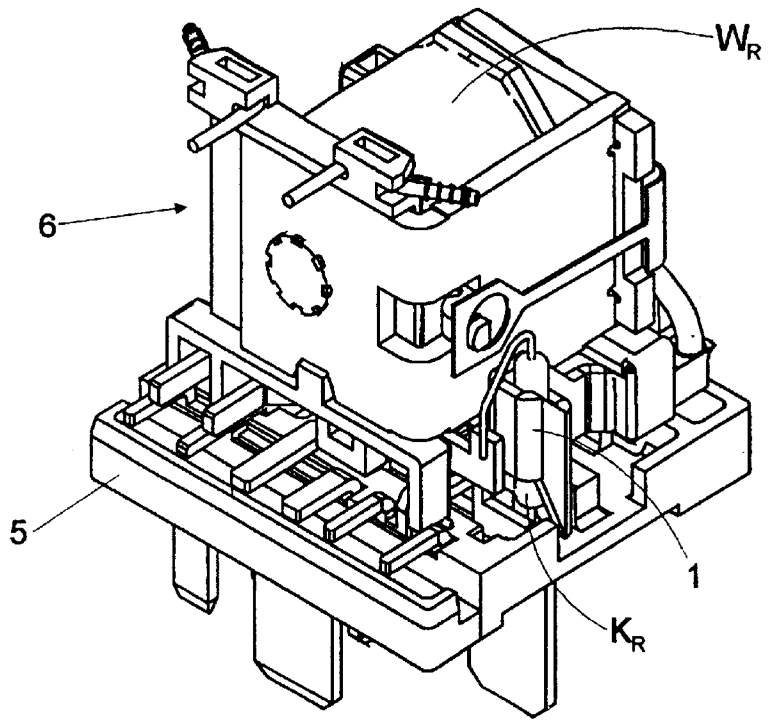
FIG. 5 shows a further modification of a relay according to the invention along with a reed contact pre-assembled to a header.
Figure 6:
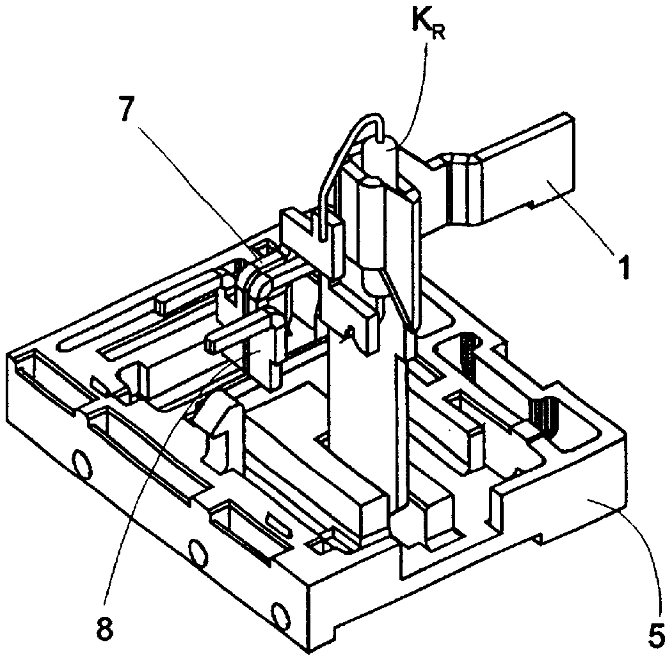
FIG. 6 shows the reed contact pre-assembled to the header along with a coupled load current conductor according to FIG. 5.

FIG. 5 shows an embodiment of a relay comprising a reed contact $K_R$ pre-assembled to a header 5, with reed contact $K_R$ being oriented perpendicularly to the base plane of header 5. In this embodiment, magnetic system 6 is mounted on header 5 in such a manner that the axis of exciting coil $W_R$ extends parallel to the base plane of header 5. Load current conductor 1 is constituted in essence by a sheet-metal strip, with a first end of load current conductor 1 being passed perpendicularly through the header and serving as terminal element. The second end of load current conductor 1 extends parallel to the axis of exciting coil $W_R$ (cf. also FIG. 6). Load current conductor 1, in a central portion thereof, is formed into a loop enclosing reed contact $K_R$. By forming load current conductor 1 in corresponding manner in this central portion, it is ensured that the magnetic field coupled by load current conductor 1 into reed contact $K_R$ penetrates the reed contact $K_R$ in central and parallel manner. Reed contact $K_R$, together with its terminal wires, is bent in U-shaped manner and has the ends of the terminal wires attached to extensions of two terminal loops 7 and 8. The connection of reed contact $K_R$ to the extensions of the terminal loops 7 and 8 disposed below magnetic system 6 can be established, for example, by soldering or resistance welding. The distance between the two terminal loops 7 and 6 defines the switching threshold of reed contact $K_R$. In all of the embodiments shown in FIGS. 1 to 6, an advantage consists in that mounting of the reed contact $K_R$ and coupling of the reed contact $K_R$ to load current conductor 1 do not require any significant constructional changes to the relay.

Figure 7:
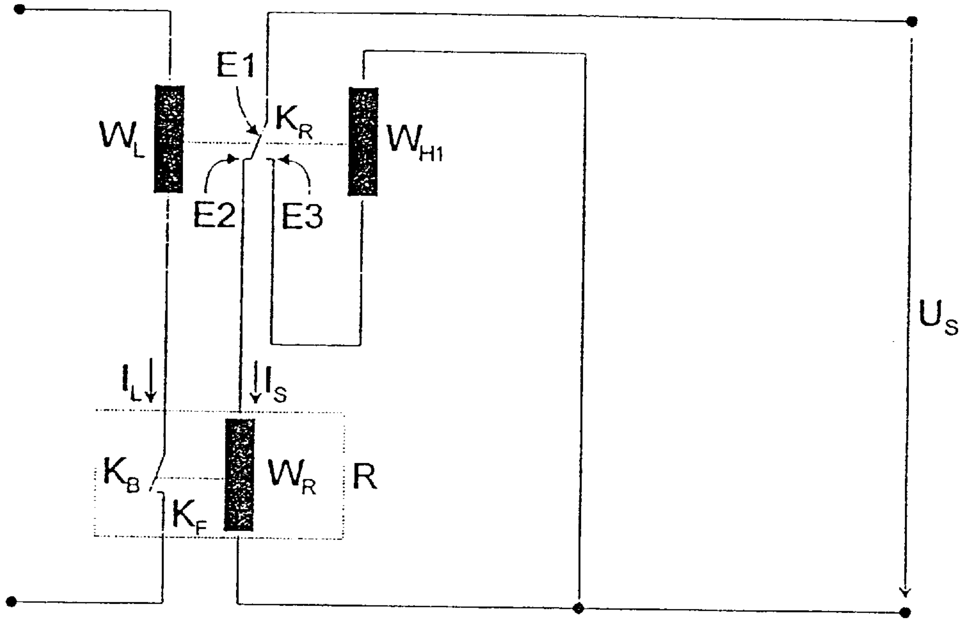
FIG. 7 shows a basic circuit diagram of a relay according to the invention, comprising an auxiliary reed contact and an auxiliary winding as over-current protection elements.

FIG. 7 shows a basic circuit diagram of a relay comprising an auxiliary reed contact and an auxiliary winding as overcurrent protection elements. Relay R comprises a control current circuit having an exciting coil $W_R$ associated therewith through which a control current $I_S$ flows, and it comprises a load current circuit, with the load current $I_L$ being controllable by a movable contact element $K_B$ and a stationary or fixed contact element $K_F$ of relay R. Arranged in the control current circuit is a reed contact $K_R$ by means of which the control current $I_S$ through exciting coil $W_R$ can be controlled. Reed contact $K_R$ is coupled to a load current conductor having the load current $I_L$ flowing therethrough. The magnetic coupling between the load current conductor and the reed contact $K_R$ is indicated in symbolic manner hereinafter by a load current conductor winding WL. In the embodiment according to FIG. 7, reed contact $K_R$ has one movable contact element E1 and two fixed contact elements E2 and E3. Moreover, an auxiliary winding $W_{H1}$ is coupled to reed contact $K_R$ in such a manner that, in an overcurrent state of operation, a magnetic field emanates from auxiliary winding $W_{H1}$ that has the same direction as a magnetic field caused by a load current conductor winding WL.

Load current $I_L$ is switched directly via movable contact element $K_B$ and fixed contact element $K_F$ of relay R. Reed contact $K_R$ may be disposed axially inside load current conductor winding $W_L$. A reed contact $K_R$ disposed outside load current conductor winding $W_L$ and arranged parallel to the winding axis is possible as well. An alternative to coupling the reed contact $K_R$ to a load current conductor winding $W_L$ is an arrangement of reed contact $K_R$ inside a loop-shaped section of a load current conductor.

To prevent that the magnetic field of exciting coil $W_R$ of relay R takes influence on the reed contact $K_R$, reed contact $K_R$ advantageously is to be arranged perpendicularly to the axis of exciting coil $W_R$. As an alternative thereto, said influence can be prevented by a magnetically conductive sheet-metal shielding plate between exciting coil $W_R$ and reed contact $K_R$. By means of the shielding plate, a magnetic stray field caused by exciting coil $W_R$ is short-circuited. Another possibility consists in introducing the magnetic stray flux emanating from exciting coil $W_R$ purposefully into reed contact $K_R$. This is possible, for example, by regulating the control current $I_S$. By doing so, reed contact $K_R$ is subjected to the effect of a constant magnetic flux as offset. By definition of corresponding threshold values at reed contact $K_R$, it is thus possible to utilize the magnetic stray field.

In a normal state of operation, reed contact $K_R$ connects exciting coil $W_R$ of relay R to a control voltage source $U_S$ via a first fixed contact element E2 of reed contact $K_R$. In this state, the auxiliary winding $W_H$ coupled to the second fixed contact element E3 is separated from the movable contact element E1 of reed contact $K_R$ and thus from control voltage source $U_S$. In contrast thereto, in an overcurrent state of operation, the movable contact element E1 of reed contact $K_R$ is connected to the second fixed contact element E3 and disconnected from the first fixed contact element E2. Due to this, exciting winding $W_R$ of relay R is separated from control voltage source $U_S$, whereas auxiliary winding $W_H$ is connected to control voltage source $U_S$. The connection between movable contact element E1 of reed contact $K_R$ and the second fixed contact element E3 is maintained also after interruption of the load current circuit, due to the magnetic flux emanating from auxiliary winding $W_H$. Only after separation from control voltage source $U_S$ will relay R return to the normal state of operation.

Figure 8:
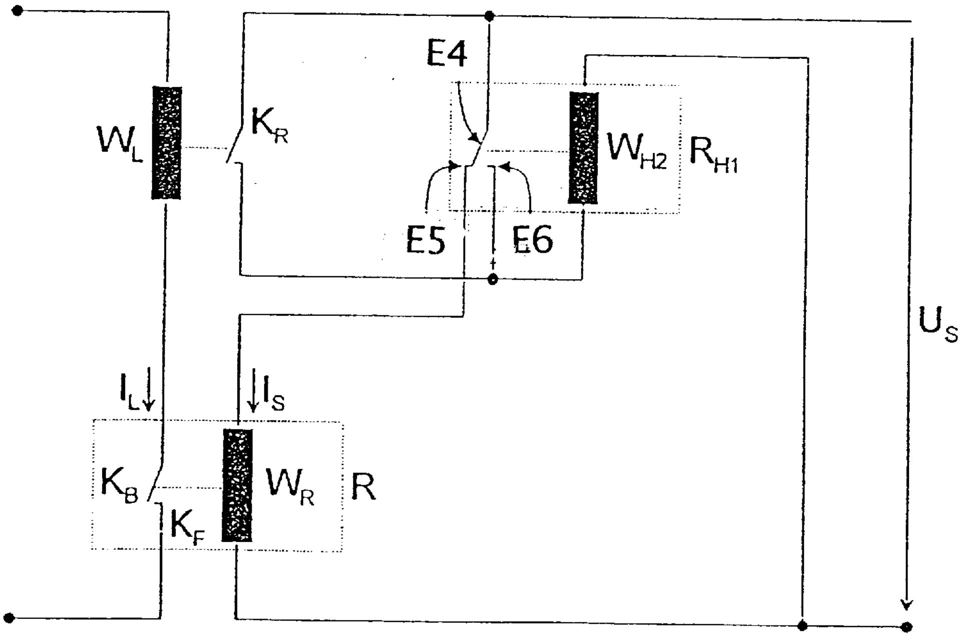
FIG. 8 shows a basic circuit diagram of an embodiment comprising an auxiliary relay as overcurrent protection element.

FIG. 8 shows a basic circuit diagram of an alternative possible development of a short-circuit-proof relay in which the overcurrent protection function is realized by means of an auxiliary relay $R_{H1}$. Auxiliary relay $R_{H1}$ comprises a movable contact element E4 and two fixed contact elements E5 and E6, with the movable contact element E4 being connected to the first fixed contact element E5 in the normal state of operation. Movable contact element E4 is connected directly to a control voltage input terminal so that the control voltage $U_S$ is applied directly to exciting coil $W_R$ of relay R. Reed contact $K_R$ is connected between the contact element E4 of auxiliary relay $R_{H1}$ and the second fixed contact element E6.

Coil $W_{H2}$ of auxiliary relay $R_{H1}$ is currentless in the normal state of operation. In the overcurrent state of operation, reed contact $K_R$ is closed whereby control voltage $U_S$ is applied directly to coil $W_{H2}$ of auxiliary relay $R_{H1}$. As a consequence thereof, movable contact element E4 is connected to the second fixed contact element E6 of auxiliary relay $R_{H1}$ and separated from the first fixed contact element E5. As a result hereof, exciting coil $W_R$ of relay R is currentless in the overcurrent state of operation. Due to the fact that the load current circuit and the control current circuit of auxiliary relay $R_{H1}$ are connected in series in the overcurrent state of operation, auxiliary relay $R_{H1}$ maintains its switching state also after interruption of the load current circuit of relay R by actuation of contact element $K_B$ and associated opening of reed contact $K_R$. If a time delay unit is arranged in addition between reed contact $K_R$ and second fixed contact element E6 of auxiliary relay $R_{H1}$, short-time load current peaks do not result in a response of the overcurrent protection means. Instead of auxiliary relay $R_{H1}$, it is also possible to use a second reed contact which then is coupled to an associated auxiliary winding.

Figure 9:
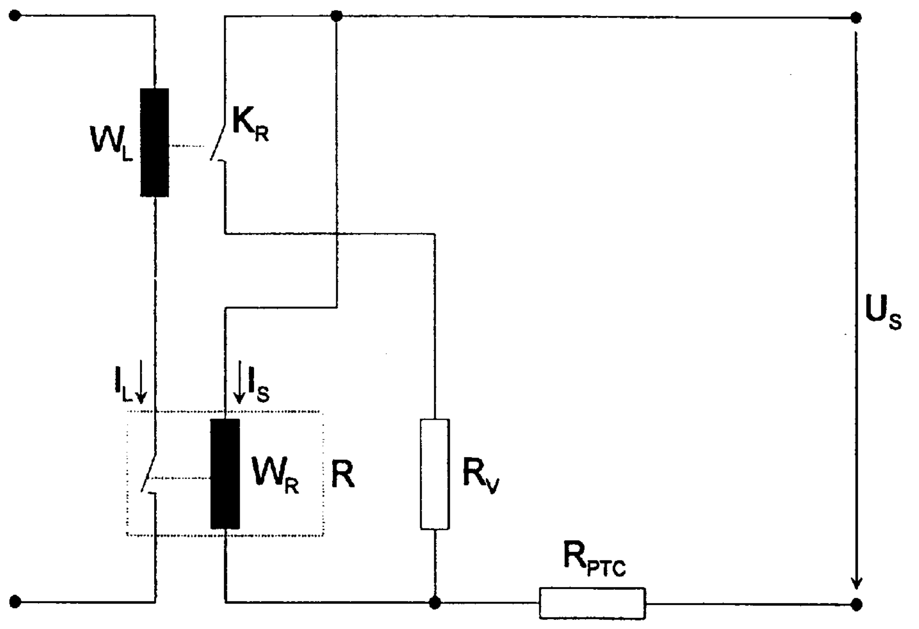
FIG. 9 shows a basic circuit diagram of a further embodiment comprising a positive temperature coefficient resistor and a protective resistor as overcurrent protection elements.

FIG. 9 shows an additional alternative for realizing an overcurrent protection, comprising a positive temperature coefficient resistor $R_{PTC}$ and a protective resistor $R_V$ connected in series therewith. These two overcurrent protection elements are connected to control voltage source $U_S$ in series with reed contact $K_R$, with the reed contact $K_R$ being first closed in the overcurrent state of operation and being opened in the normal state of operation. Exciting coil $W_R$ of relay R is connected in parallel with reed contact $K_R$ and protective resistor $R_V$ and in series with positive temperature coefficient resistor $R_{PTC}$. Due to the fact that protective resistor $R_V$, in comparison with the internal resistance of exciting coil $W_R$ of relay R, is of low resistance, an increased current flows through positive temperature coefficient resistor $R_{PTC}$ upon closure of reed contact $K_R$, whereby positive temperature coefficient resistor $R_{PTC}$ is heated and changes to high resistance. Due to this, the voltage drop at exciting coil $W_R$ of the relay decreases, so that interruption of the load current circuit takes place. Depending on the heating behavior of positive temperature coefficient resistor $R_{PTC}$, a time delay is achieved, whereby short-time load current peaks do not effect protection triggering. In addition thereto, positive temperature coefficient resistor $R_{PTC}$ performs a state storing function provided that the residual current through exciting coil $W_R$ of relay R is sufficient to maintain the required temperature of the positive temperature coefficient resistor. In that case, positive temperature coefficient resistor $R_{PTC}$ remains in the high-resistance state also after re-opening of reed contact $K_R$. Only after separation from control voltage source $U_S$ and cooling down of positive temperature coefficient resistor $R_{PTC}$ will renewed driving of relay R be possible.

Figure 10:
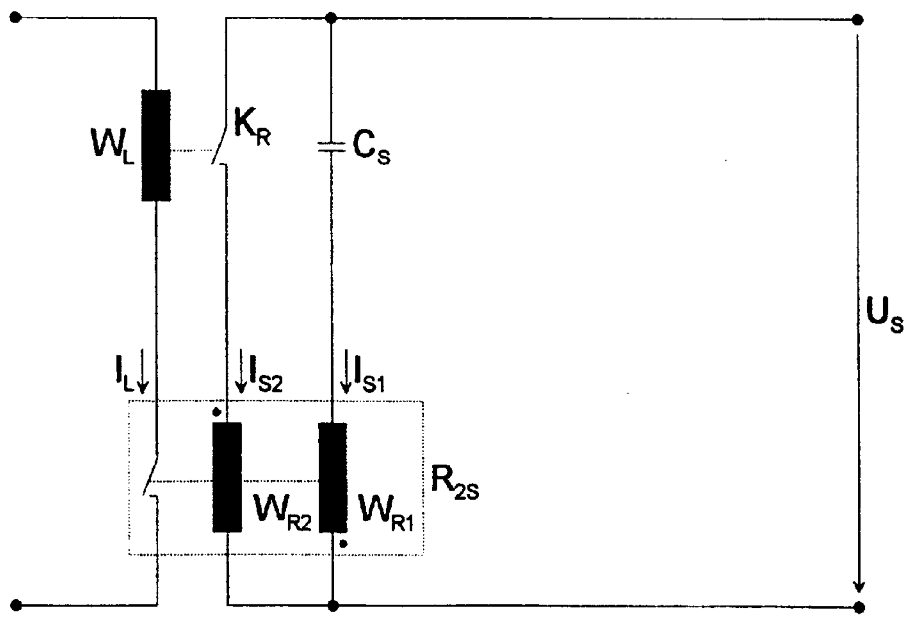
FIG. 10 shows a basic circuit diagram of a bistable embodiment comprising a capacitor as pulse controlling element.

FIG. 10 shows a basic circuit diagram of an embodiment comprising a bistable relay $R_{2S}$ and a capacitor $C_S$. Bistable relay $R_{2S}$ is provided with a first exciting coil $W_{R1}$ and a second exciting coil $W_{R2}$. First exciting coil $W_{R1}$ of relay $R_{2S}$ is connected to control voltage source $U_S$ in series with capacitor $C_S$. Second exciting coil $W_{R2}$ is connected to control voltage source $U_S$ in series with reed contact $K_R$ and is of opposite winding direction as compared to first exciting coil $W_{R1}$. A positive pulse of current $I_{S1}$, through first exciting coil $W_{R1}$ thus effects closing of the load current circuit, whereas a positive pulse of current $I_{S2}$ through second exciting coil $W_{R2}$ interrupts the load current circuit. In case of overcurrent, reed contact $K_R$ connects second exciting coil $W_{R2}$ at first to control voltage source $U_S$, whereupon relay $R_{2S}$ changes to a stable switched off state. Only after deactivation and renewed switching on of control voltage $U_S$ does the first exciting coil $W_{R1}$ receive a positive current pulse via capacitor $C_S$, whereby relay $R_{2S}$ changes over to a stable switched-on state.

In the basic circuit diagram of a modification of the short-circuit- and overcurrent-proof relay, the overcurrent protection functions are integrated in an overcurrent protection means that is realized by an electronic circuit CCU. Electronic circuit CCU comprises four terminals, with the control voltage $U_S$ being applied between a first control voltage terminal K1 and a second control voltage terminal K2. In addition thereto, electronic circuit CCU comprises a first exciting coil terminal K3 and a second reed contact terminal K4. First reed contact terminal and second exciting coil terminal are connected to second control voltage terminal K2. Electronic circuit CCU, as application-specific integrated circuit (ASIC), can be integrated very easily in circuit board 4 of the relay shown in FIG. 1 or also in header 5 of the relays shown in FIGS. 3 and 5.

Figure 11:
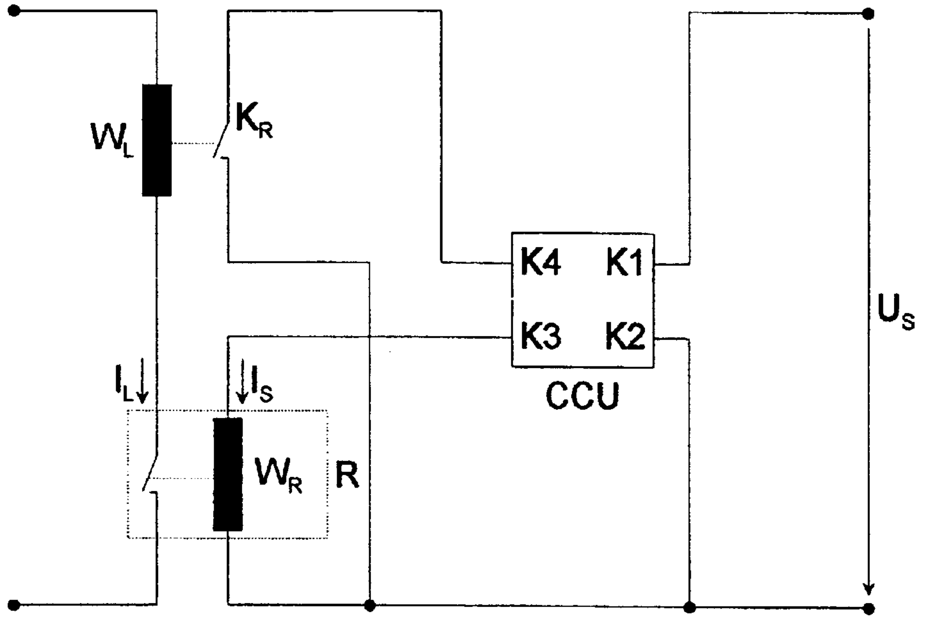
FIG. 11 shows a basic circuit diagram of an embodiment comprising an electronic evaluation unit for overcurrent recognition and load current deactivation.
Figure 12:
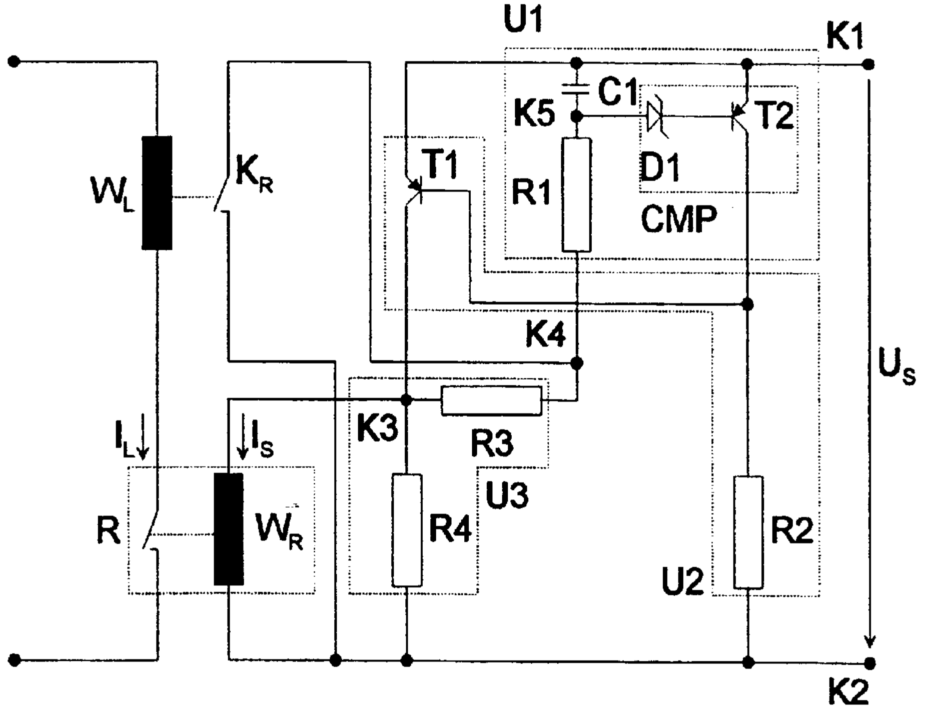
FIG. 12 shows a realization of the electronic evaluation unit according to FIG. 11.

A possible realization of the overcurrent protection means according to FIG. 11 in terms of circuit technology is shown in FIG. 12. Electronic circuit CCU is segmented in the form of a timing element U1, a switching-on segment U2 for exciting coil $W_R$, and a switching-off segment U3. Switching-on segment U2 for relay coil $W_R$ consists of a pnp transistor T1 connected in series with relay coil $W_R$ between the two control voltage terminals K1 and K2, and of a protective resistor R2. Transistor T1 has its emitter connected to first control voltage terminal K1 and its collector connected to first exciting coil terminal K3. Protective resistor R2 of switching-on segment U2 is connected between the base of transistor T1 and the second control voltage terminal K2.

The switching-off segment U3 for exciting coil $W_R$ is constituted by a first resistor R4 and a second resistor R3. First resistor R4 is connected in parallel to exciting coil $W_R$, while second resistor R3 of switching-off segment U3 is connected between first exciting coil terminal K3 and second reed contact terminal K4.

Timing element U1 comprises a comparator CMP and an RC member, with the capacitor C1 of the RC member having a first terminal connected to the first control voltage terminal K1. Resistor R1 of the RC member is connected between second terminal K5 of capacitor C1 and second reed contact terminal K4. The comparator CMP proper consists of a pnp transistor T2 and a Zener diode D1, with the transistor T2 of comparator CMP having its emitter connected to first control voltage terminal K1 while the collector of transistor T2 is connected to the base of transistor T1 of the switching-on segment U2. The base of transistor T2 of comparator CMP is connected to the cathode of Zener diode D1 the anode of which is connected between capacitor C1 and resistor R1 of the RC member.

When control voltage $U_S$ is applied to control voltage terminals K1 and K2 of electronic circuit CCU, a control current flows across the emitter-to-base path of transistor T1 of switching-on segment U2 and connects transistor T1 through. Exciting coil $W_R$ of relay R thus has a switching voltage supplied thereto, whereupon the load current circuit is closed. Switching of transistor T1 takes place via resistor R2, with the switching speed of the transistor playing an important role. For, it must be ensured prior to activation of timing element U1 that relay R is connected through first by application of control voltage $U_S$. In doing so, the function of timing element U1 consists in blocking transistor T2 of comparator CMP until transistor T1 of switching-on segment U2 is connected through. Thereafter, transistor T2 of comparator CMP also changes over to a stable blocked state, which is achieved by the feedback of the collector voltage of transistor T1 via resistors R3, R1 and via Zener diode D1.

In case of overcurrent, reed contact $K_R$ closes and connects the base of transistor T2 directly to second control voltage terminal K2. This effects discharge of capacitor C1 via resistors R1 and R3. Upon exceeding the breakdown voltage at Zener diode D1, a control current flows through the emitter-to-base path of transistor T2 which connects transistor T2 through and electrically connects the base of transistor T1 of switching-on segment U2 to first control voltage terminal K1. As a result of this, switching-off segment U3 is activated via transistor T2 of timing element U1, whereby transistor T1 of the switching-on segment U2 changes over to the blocked state. Consequently, exciting coil $W_R$ of relay R is disconnected from control voltage source $U_S$ so that the load current circuit is interrupted. The consequence hereof is that reed contact $K_R$ opens again as there is no overcurrent flowing through the load circuit then. Switching-off segment U3 remains activated since transistor T2 of comparator CMP as before is in the conducting state. This operational state is maintained or stored until control voltage $U_S$ at control voltage terminals K1 and K2 of electronic circuit CCU is switched off.

Undesired response of the overcurrent protection means in case of switching-on or switching-over current peaks, which as a rule are less than some 100 milliseconds, is prevented by timing element U1. By suitable dimensioning of resistor R1, capacitor C1 of timing element U1, and of resistors R3 and R4 of switching-off segment U3 and by selection of a Zener diode D1 with a suitable breakdown voltage, the time behavior of electronic circuit CCU can be matched to the duration of switching-on and switching-over current peaks to be expected, respectively. At the same time, interference pulses at control voltage terminals K1 and K2 are filtered out by means of timing element U1 as well.

What is claimed is:

1. An electromagnetic relay comprising:

a magnetic system having an exciting coil ($W_R$) through which a control current flows and which is connected to a control voltage ($U_S$), and having a core and an armature, with the core and the armature forming at least one operating air gap;

at least one movable contact element and at least one fixed contact element through which a load current circuit can be closed in response to the presence of said control current flowing through said exciting core;

coil and contact terminal elements;

a reed contact in each load current circuit, which is magnetically coupled to a load current conductor having a load current flowing therethrough; and means magnetically coupled to the reed contact for generating and processing an overcurrent signal and for switching off the control current;

wherein these means further process said overcurrent signal such that the switched-off state of the control current is maintained until switching off the control voltage.

2. The relay of claim 1, wherein the reed contact is integrated in an electrically and magnetically conductive open flux ring enclosing the load current conductor.

3. The relay of claim 1, wherein the reed contact is magnetically coupled via two air gaps to an electrically and magnetically conductive open flux ring enclosing the load current conductor.

4. The relay of claim 1, wherein the load current conductor has a section formed in a loop enclosing the reed contact.

5. The relay of claim 1, wherein the load current conductor has a section arranged perpendicularly to the reed contact, with the magnetic flux coupled from the load current conductor to the reed contact ($K_R$) penetrating the reed contact in central and parallel manner.

6. The relay of claim 1, wherein the load current conductor has a section wound to a coil, with the reed act being disposed axially in the coil.

7. The relay of claim 1, wherein the load current conductor has a section wound to a coil, with the reed contact being disposed outside of the coil parallel to the axis thereof.

8. The relay of claim 1, wherein the reed contact is arranged perpendicularly to the axis of the exciting coil.

9. The relay of claim 1, wherein a magnetically conductive sheet-metal member is arranged between the reed contact and the exciting coil.

10. The relay of claim 1, wherein the exciting coil is coupled to a current adjusting means for introducing a defined magnetic flux into the reed contact.

11. The relay of claim 1, wherein the means for generating and processing the overcurrent signal and for switching off the control current are combined to form an overcurrent protection unit.

12. The relay of claim 11, wherein the reed contact comprises a movable contact element and two fixed contact elements, the overcurrent protection unit is constituted by an auxiliary coil coupled with the reed contact, the movable contact element of the reed contact is connected to a first control voltage terminal, a first terminal of the exciting coil is connected to a first fixed contact element of the reed contact, a first terminal of the auxiliary winding is connected to the second fixed contact element of the reed contact, the second terminal of the exciting coil and the second terminal of the auxiliary winding are connected to the second control voltage terminal, the movable contact element of the reed contact, in a normal state of operation, is connected to the first fixed contact element of the reed contact, and the movable contact element of the reed contact, in an overcurrent state of operation, is connected to the second fixed contact element of reed contact.

13. The relay of claim 12, wherein the auxiliary winding is coupled to the reed contact in such a manner that, in the overcurrent state of operation, a magnetic field emanates from the current-conducting auxiliary winding which, at the reed contact, has the same direction as the magnetic field effected by the load current.

14. The relay of claim 11, where the overcurrent protection unit is constituted by an electromagnetic switching unit comprising a movable contact element, two fixed contact elements and a coil, the movable contact element of the switching unit is connected to a first control voltage terminal, a first terminal of the exciting coil is connected to a first fixed contact element of the switching unit, a first terminal of the coil of the switching unit is connected to the second fixed contact element of the switching unit, the second terminal of the exciting coil and the second terminal of the coil of the switching unit are connected to the second control voltage terminal, the reed contact is connected between the first control voltage terminal and the first terminal of the coil of the switching unit, the movable contact element of the switching unit, in a normal state of operation, is connected to the first fixed contact element of the switching unit, and the movable contact element of the switching unit, in an overcurrent state of operation, is connected to the second fixed contact element of the switching unit.

15. The relay of claim 14, wherein a time delay unit is connected between the reed contact and the coil of the switching unit.

16. The relay of claim 11, wherein the overcurrent protection unit is realized by a positive temperature coefficient resistor and a protective resistor connected in series therewith, which are connected to the control voltage source in series with the reed contact, the reed contact is opened in a normal state of operation and closed in an overcurrent state of operation, and the relay coil is connected in parallel with the reed contact and the protective resistor as well as in series with the positive temperature coefficient resistor.

17. The relay of claim 11, wherein the overcurrent protection means is integrated in the magnetic system which comprises an additional second exciting coil for realizing two stable switching states, with the exciting coils having opposite winding directions, and a control current through the first coil bringing the relay to an on-state whereas a control current through the second coil brings the relay to an off state, the first coil $W_{R1}$ is connected to the control voltage source $U_S$ in series with a capacitor $C_S$, and the second coil $W_{R2}$ is connected to the control voltage source $W_{R2}$ in series with the reed contact $K_R$.

18. The relay of claim 11, wherein the overcurrent protection means is realized by an electronic circuit CCU comprising a first control voltage terminal K1 and a second control voltage terminal K2, and the circuit CCU comprises a timing member U1, a switching-on segment U2 for the exciting coil $W_R$ and a switching-off segment U3.

19. The relay of claim 18, wherein the switching-on segment for the exciting coil consists of a pnp transistor connected between the two control voltage terminals in series with the exciting coil, and of a protective resistor, the transistor of the switching-on segment has its emitter connected to the first control voltage terminal and its collector to a first exciting coil terminal, the exciting coil has its second terminal connected to the second control voltage terminal, and the protective resistor of the switching-on segment is connected between the base of the transistor of the switching-on segment and the second control voltage terminal.

20. The relay of claim 19, wherein the switching-off segment for the exciting coil is constituted by a first resistor and a second resistor, the first resistor of the switching-off segment is connected in parallel with the exciting coil, the reed contact has a first terminal connected to the second control voltage terminal, and the second resistor of the switching-off segment is connected between the first terminal of the exciting coil and the second terminal of the reed contact, and the timing member comprises a comparator including a pnp transistor and a Zener diode, and an RC member, the capacitor of the RC member has a first terminal connected to the first control voltage terminal, and in that the resistor of the RC member is connected between the second terminal of the capacitor and the second terminal of the reed contact, the pnp transistor has its emitter connected to the first control voltage terminal, the transistor of the comparator has its collector connected to the base of the transistor of the switching-on segment, the transistor of the comparator has its base connected to the cathode of the Zener diode, and the Zener diode has its anode connected between the capacitor and the resistor of the RC member.

* * * * *